United States Patent

[11] 3,550,658

[72] Inventors John J. Lindsey
Lafayette;
William R. Lindsey, Pleasant Hills, Calif.
(100 Bancroft Road, P.O. 635, Concord, Calif., 94520)
[21] Appl. No. 730,886
[22] Filed May 21, 1968
[45] Patented Dec. 29, 1970

[54] NUT-KERNEL DICING MACHINE
7 Claims, 11 Drawing Figs.
[52] U.S. Cl. .................................................. 146/78, 146/76, 146/222
[51] Int. Cl. .............................................. B26d 4/28, A23n 5/00
[50] Field of Search........................................... 146/78, 166, 71.5, 222, 223, 76; 241/76; 209/223

[56] References Cited
UNITED STATES PATENTS
| | | | |
|---|---|---|---|
| 1,350,506 | 8/1920 | Kennedy | 146/76X |
| 2,079,241 | 5/1937 | Burt | 209/223X |
| 251,192 | 12/1881 | Cranson | 241/76X |
| 1,374,657 | 4/1921 | Hiller | 146/22X |
| 2,545,720 | 3/1951 | Abbott | 146/166X |
| 2,554,918 | 5/1951 | Morgan | 146/166X |

Primary Examiner—Andrew R. Juhasz
Assistant Examiner—Z. R. Bilinsky
Attorney—Gardner and Zimmerman ABSTRACT: Apparatus for dicing or cutting the kernels or meats of walnuts and the like to subdivide the same into smaller units. The apparatus includes a hopper into which the nut kernels are placed, a plurality of cutting stations respectively equipped with cutting mechanisms operative to subdivide the kernels by dicing the same into smaller units, and a classification station at which the subdivided kernels are separated or classified into a plurality of groups in accordance with their sizes.

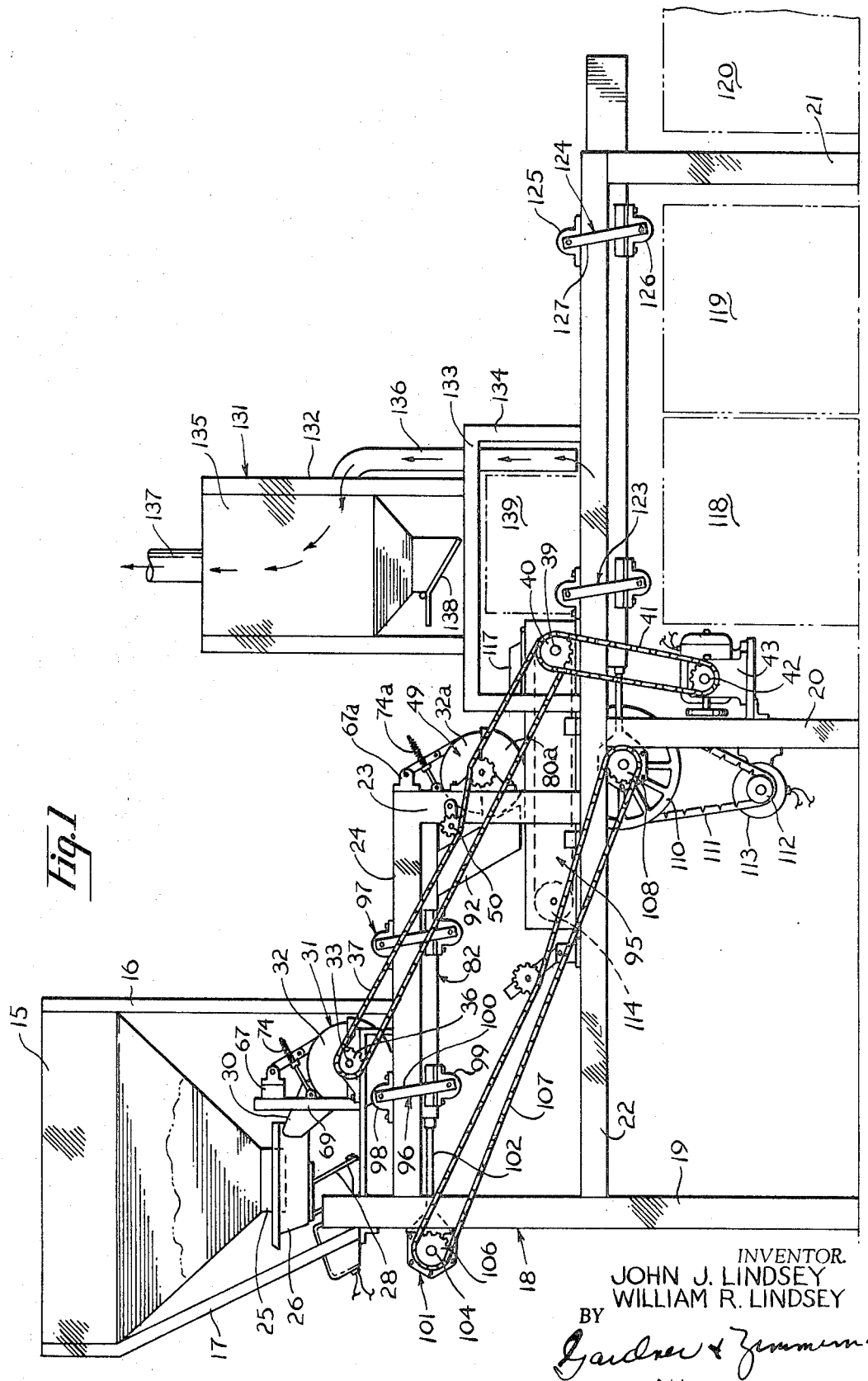

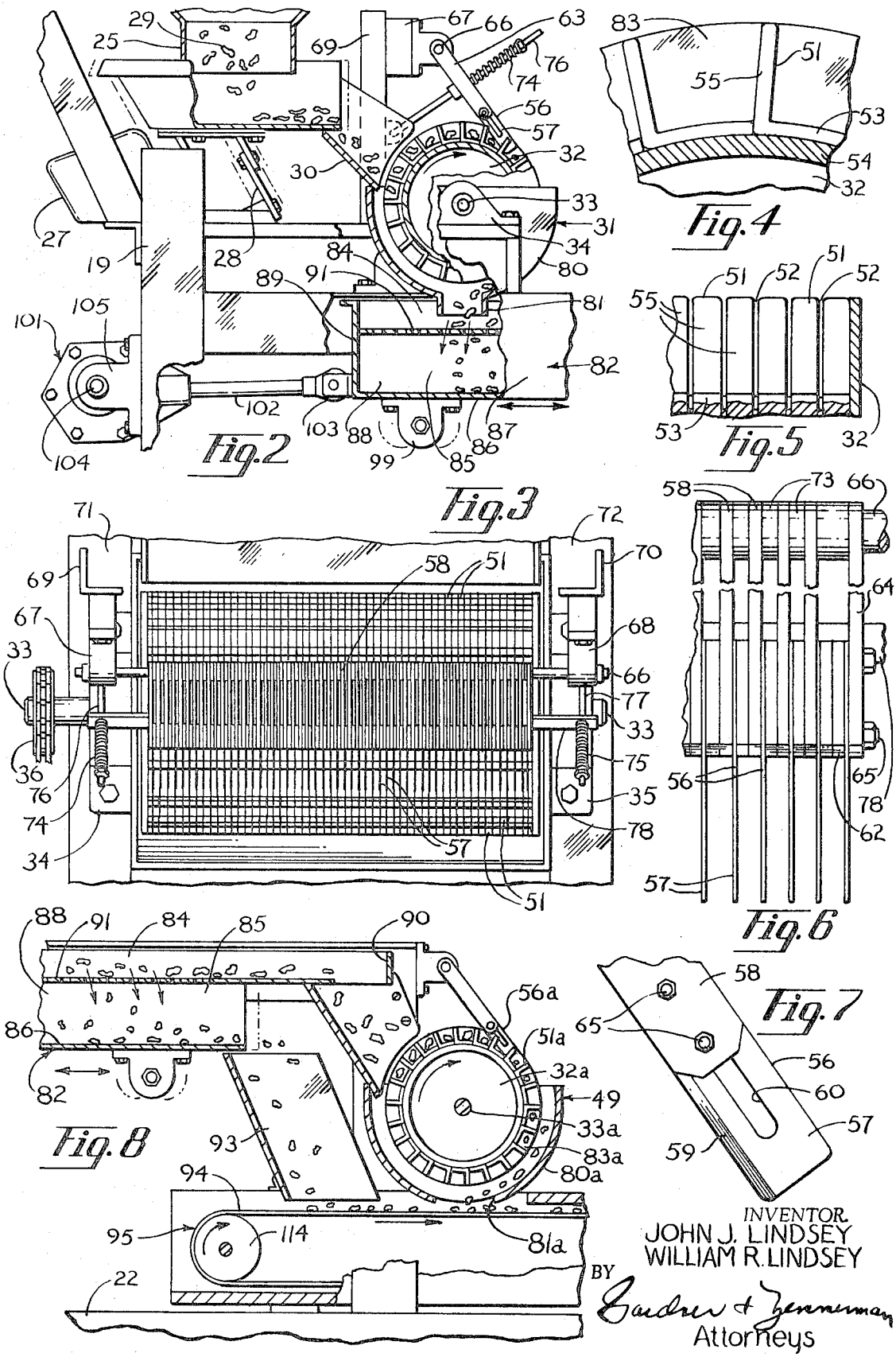

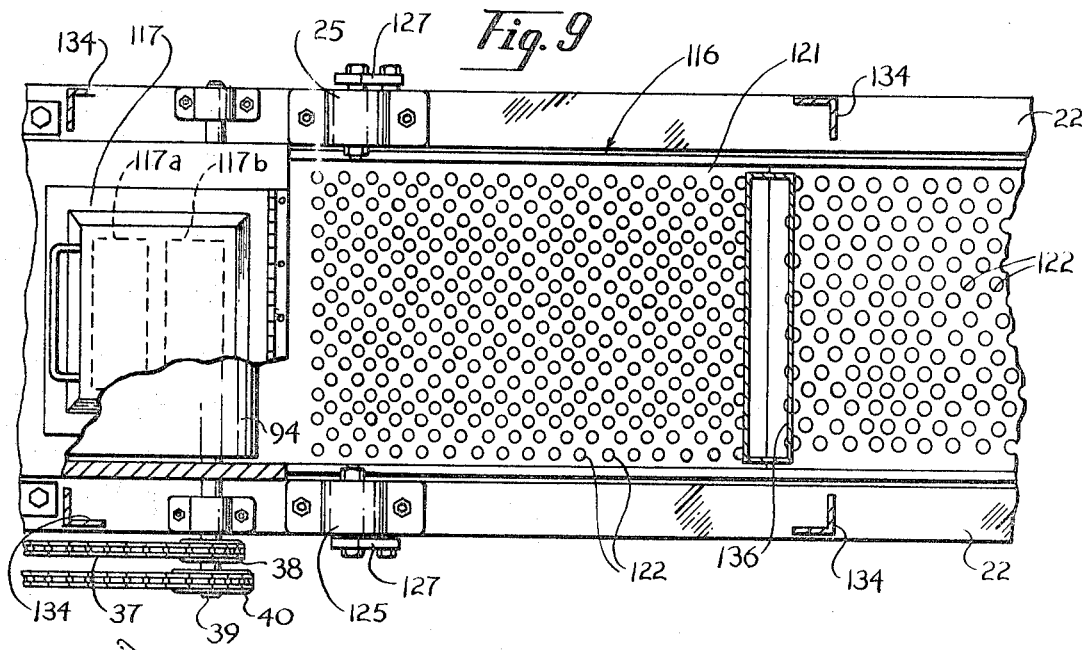
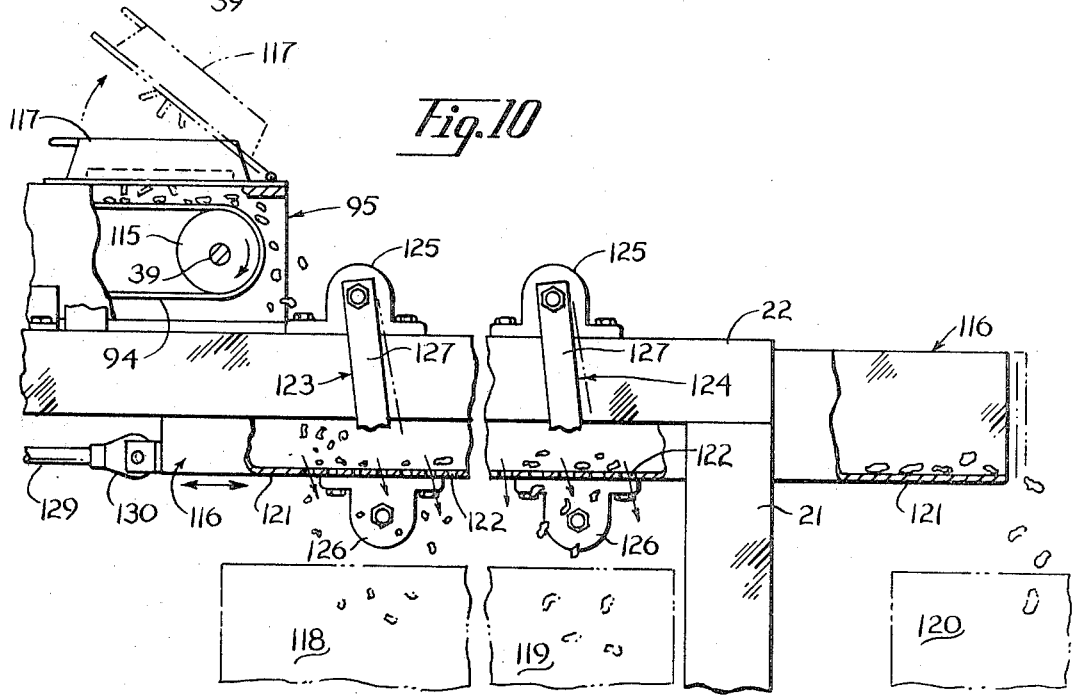
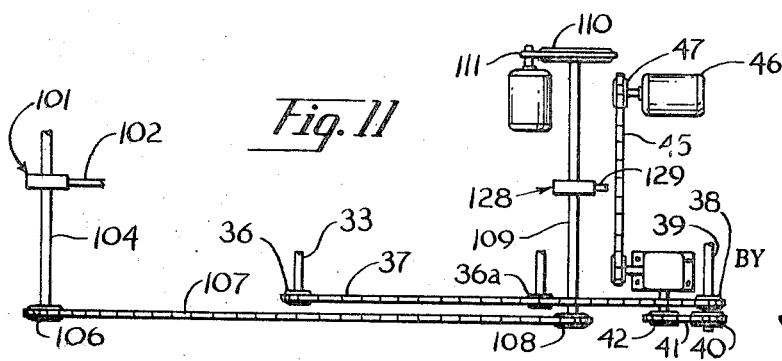

NUT-KERNEL DICING MACHINE

DISCLOSURE

This invention relates to a machine or apparatus for subdividing nut kernels and the like into smaller units, and for classifying the subdivided kernels in accordance with their sizes into a plurality of groups; and it relates more particularly to apparatus for dicing or cutting the nut kernels into such smaller units. Although the apparatus can be used in subdividing and classifying a variety of nut and nutlike products, the kernels or meats of walnuts may be taken as a specific instance of a product with which the apparatus is useful.

In the commercial preparation of nut meats for packaging and sale, automatic equipment is used wherever feasible since such machinery reduces cost by minimizing the requirement for expensive manual operations. Such use of automatic equipment not only extends to cracking the shells of nuts to separate the kernels or meats therefrom, but it also extends to subdividing the kernels and then classifying the same in accordance with their size prior to packaging the kernels for shipment and for subsequent sale to the consumer. Evidently the nut kernels in being the edible portion of a nut, are relatively expensive and loss or other waste thereof must be held to a minimum if the automatic processing operations are to be economically feasible. Therefore, it is customary to divide nut kernels into various sizes and package the same in accordance therewith so as to utilize substantially all of the kernel including the very small particles thereof that may result from cracking the shell to obtain the kernel and that also may result from subdividing the kernels into smaller units.

In this respect, apparatus heretofore in use for subdividing the kernels of walnuts and the like has usually employed either a grinding action or a breaking action to effect such subdivision, and in either case it is common to have as a byproduct a great number of small particles some of which are so small as to be almost dustlike in size. It will be appreciated that nut particles of such minute size are less valuable than the larger size particles, and generally result in substantial weight loss in the form of unusable waste. In view of this, an object, among others, of the present invention is to provide an improved apparatus for subdividing the kernels or meats of walnuts and the like which does not employ a grinding or a breaking action in subdividing such kernels and, instead, dices or cuts the same so as to minimize the creation of very small, unusable or less valuable nut particles. Additional objects and advantages of the invention, especially as concerns specific features and characteristics thereof, will become apparent as the specification develops, and among such additional objects are included an arrangement for classifying the subdivided nut kernels in accordance with their size and for providing a dicing or cutting mechanism having means for minimizing breakage and other damage thereto.

The apparatus includes a hopper into which nut kernels, both whole and broken, are placed and from which the kernels are advanced to a cutting station at which the kernels are cut or diced so as to subdivide the same into smaller units. Upon discharge of the subdivided kernels from such cutting mechanism, the kernels are separated in accordance with their size, and those that exceed a predetermined size are advanced to a second cutting station at which they are further subdivided into smaller units. The apparatus also provides a classification means at which the subdivided kernels are separated in accordance with their size. Means are provided to remove metallic objects from the nut kernels and also to separate the thin divider membrane, skin and other lightweight membranes associated with many nuts from the kernels thereof.

An embodiment of the invention is illustrated in the accompanying drawings, in which:

FIG. 1 is a side view in elevation of apparatus embodying the invention;

FIG. 2 is an enlarged, vertical sectional view showing a portion of the apparatus and in particular the first cutting or dicing station thereof;

FIG. 3 is a broken top plan view of such station taken generally along the line 3–3 of FIG. 2;

FIG. 4 is a further enlarged, broken fragmentary view showing a portion of the cutting elements carried by the rotatable drum of the first cutting or dicing mechanism;

FIG. 5 is a broken vertical sectional view taken along the line 5–5 of FIG. 4;

FIG. 6 is an enlarged, broken top plan view illustrating the stationary knives forming a part of the first dicing or cutting mechanism;

FIG. 7 is a broken side view in elevation showing one of the stationary cutting blades;

FIG. 8 is an enlarged, broken transverse sectional view showing the mechanism comprising the second cutting or dicing station;

FIG. 9 is a broken top plan view showing a portion of the classification mechanism;

FIG. 10 is a broken side view in elevation of the classification mechanism illustrated in FIG. 9; and FIG. 11 is a somewhat diagrammatic view illustrating the drive chain of the apparatus shown in FIG. 1.

The kernel cutting or dicing apparatus is shown in its entirety in FIG. 1, and it includes a generally cone-shaped hopper 15 of standard and conventional design that is supported by a plurality of standards 16 and 17 fixedly attached to the frame structure of the apparatus. Such frame structure is generally denoted with the numeral 18 and includes a plurality of upwardly extending legs 19, 20 and 21, horizontally disposed beams 22, and a platform or elevated section comprising vertical supports 23 and horizontal elements 24. All of the frame components are fixedly interconnected and are braced wherever necessary to provide a rigid support for the various components of the apparatus, and the frame, and especially the various depending legs thereof, are adapted to be supported upon a floor or other platform therefor. The frame components and standards for the hopper 15 may be rigidly interrelated in any conventional manner as by means of welding, nut and bolt fasteners, etc.

The hopper 15 is provided at its lower end with a restricted neck 25 that empties into a vibrator tray 26 having vibratory displacements imparted thereto by a vibrator motor 27 connected thereto through support structure 28. As respects the present invention, the vibrator motor 27, support structure 28 and vibrator tray 26 may be conventional and the function thereof is to provide a relatively uniform discharge of nutmeats or nut kernels 29 (FIG. 2) into a chute 30 for delivery thereby to a cutting or slitting mechanism 31 defining the first cutting station of the apparatus.

The cutting mechanism 31 includes a drum 32 equipped with a shaft 33 extending therethrough that is supported for rotation at its opposite ends in bearings 34 and 35. As shown best in FIGS. 1 and 3, the shaft 33 extends outwardly beyond the bearing 34 and is equipped with a sprocket 36 effective to rotatably drive the drum 32. In this respect, the sprocket 36 has an endless chain 37 entrained thereabout which operatively engages an idler sprocket 38 (FIG. 11) supported for rotation by the frame structure 18 of the apparatus.

The sprocket 38 is mounted upon a shaft 39 so as to rotate therewith, and constrained upon the same shaft 39 is a sprocket 40 having an endless chain 41 entrained thereabout that is also entrained about the output sprocket 42 of a gear reducer 43 having an input sprocket 44 driven through an endless chain 45 by an electric motor 46 having an output sprocket 47 about which the chain 45 is entrained. Evidently, when the motor 46 is energized, the drum 32 will be rotated through the described drive train, and it may be noted that at the same time the endless chain 37 rotatably drives the drum of a slitting or cutting mechanism 49 defining the second cutting or dicing station of the apparatus. As is conventional in drive trains of this type, a spring-biased idler sprocket 50 is used to take up slack in the chain 37.

The cutting or slitting mechanism 31 includes, in addition to the drum 32 and shaft 33 providing a rotatable support therefor, a plurality of generally L-shaped blades or cutting elements 51 which are arranged in angularly spaced rows (as seen in FIGS. 2 and 4), each row of which comprises a plurality of spaced apart blades (FIG. 5) defining knife-receiving spaces 52 therebetween. As indicated hereinbefore, each blade 51 is generally L-shaped and the base leg 53 thereof is generally arcuate so as to seat firmly upon the circumferential shell or surface 54 of the drum 32 to which it is welded or otherwise fixedly secured. The other leg 55 of each blade 51 extends generally radially outwardly from the cylindrical shell 54 of the drum; and, therefore, at any particular angular location along such shell, the row of blade elements 51 presents the configuration shown in FIG. 5 in which the upwardly extending legs 55 of the blades 51 are equally spaced from each other by the intermediate slots 52.

Cooperative with the rotatably driven drum 32 and blade elements 51 carried thereby are a plurality of stationary knife structures 56, each of which comprises (as shown in FIG. 7) a knife 57 and a support or holder 58 therefor. Each knife 57 has a beveled or tapered cutting edge 59, and it is provided with an elongated slot 60 through which pass a plurality of bolts 61 used to secure the blade 57 to the holder 58. Evidently, the elongated slot 60 enables the extent of the projection of the knife 57 from the holder 58 to be adjusted. The knives 57 are spaced apart (as shown in FIG. 6), and the spacing therebetween is accurately maintained by a plurality of spacers 62 interposed between the blade structures 57 and, more particularly, between the various holders 58 thereof. It may be observed that the spacing between adjacent knives 57 aligns the same with the slots 52 between the blades 51 so that the knives 57 respectively pass therethrough, as will be described hereinafter.

All of the knife structures 56 are bolted together and are secured to outer frame or carrier elements 63 and 64 by a plurality of transversely disposed, elongated bolts 65. Each of the blade holders 58 together with the carrier elements 63 and 64 are pivotally supported for angular displacements about the axis of a shaft 66 carried at opposite ends thereof by supports 68 and 67 welded or otherwise secured to L-shaped channels 69 and 70 that in turn are welded or otherwise rigidly secured to support members 71 and 72, respectively, that are mounted upon the horizontal elements 24 of the frame structure. Thus, the knife structures 56 are pivotal as a unit about the axis of the shaft 66 in clockwise and counterclockwise directions, as viewed in FIG. 2; and to further maintain the spacing between the blade structures, additional spacer members 73 are mounted upon the shaft 66 and are respectively interposed between the holders 58.

As stated hereinbefore and as illustrated in FIG. 3, the knives 57 are respectively aligned with the slots 52 defined between the upwardly extending legs 55 of the L-shaped blades 51, and they are oriented so as to substantially tangent to the cylindrical surface of the shell 54, as shown best in FIG. 2. Thus, at the point of contact of the knives 57 and the shell 54, the beveled cutting edge 59 of each blade is substantially normal to the outer surface of such shell, or, more particularly, normal to a radial line extending therethrough at such point of contact. All of the knife structures are resiliently urged downwardly into engagement with the outer surface of the shell 54 so as to ride thereupon by a pair of helical compression springs 74 and 75.

The springs 74 and 75 are respectively disposed circumjacent pins or rods 76 and 77, and are fixedly secured thereto at their outer end portions so that the springs cannot move outwardly along such rods. At their inner ends, the springs seat upon a transversely extending bar 78 that underlies the various holders 58 and the carrier elements 63 and 64 and is welded or otherwise fixedly secured thereto, wherefore such bar 78 is effectively secured to the various holders 58. The bar 78 is provided with openings that freely pass the rods 76 and 77 therethrough so that substantially no frictional inhibition to relatively free movement therebetween exists. Therefore, the bar 78 together with the carrier elements 63 and 64 and knife structures 56 are freely displaceable in angular directions without restraint from the rods 76 and 77, which rods at their inner lower ends are pivotally secured to the L-shaped channels 69 and 70 by bearings 79, as shown in FIG. 2.

Thus, the compression springs 74 and 75 resiliently bias the blades 57 toward the outer cylindrical surface of the shell 54 of the rotatable drum 32, but permit such blades to be displaced outwardly (in a counterclockwise direction as viewed in FIG. 2) so as to enable nut shells, hard nut kernels, or other hard objects to pass beneath the knives 57 without damage thereto or to other elements of the cutting mechanism 31.

As shown in FIG. 2, a semicylindrical tray or scroll 80 of slightly larger diameter than the drum 32 encloses the lower portion thereof so as to collect and guide nut kernels processed by the cutting mechanism 31 into a restricted opening or mouth 81 for discharge therethrough into a vibratory or longitudinal reciprocable transfer tray structure 82. The chute 30 extends into the scroll 80 adjacent the upper edge thereof and terminates in proximity with the angularly spaced rows of blade structures 51, which rows thereof define pockets 83 therebetween into which the nut kernels 29 are discharged from the chute 30. Clearly, such nut kernels are severed or subdivided into smaller units as they are advanced by the drum 32 in a clockwise direction, as seen in FIG. 2, because of the cooperative slitting or cutting action of the blade structures 51 and knife structures 56.

The longitudinally displaceable tray structure 82 has upper and lower sections or compartments 84 and 85, as seen most clearly in FIGS. 2 and 8; and in its entirety includes a substantially imperforate bottom wall 86, upwardly extending sidewalls 87 and 88, end walls 89 and 90, and a perforate divider wall 91 having openings therein of a predetermined size adapted to pass nut kernels of a smaller size downwardly therethrough and into the lower section 85. Kernels of larger size are retained within the upper section 84 and are advanced by the tray structure along the divider wall 91 thereof into a chute 92 for discharge into the aforementioned slitting or cutting mechanism 49. In an analogous manner, the smaller nut kernels that pass into the lower tray section 85 are advanced along the bottom wall 86 thereof from which they drop into a chute 93 that deposits such kernels onto the endless belt 94 of a conveyor structure generally denoted 95.

The transfer tray structure 82 is supported at spaced apart locations for longitudinally oriented vibratory movements, and such supports are best seen in FIG. 1 and are respectively denoted with the numerals 96 and 97. The supports 96 and 97 are substantially identical, and each includes upper journal or bearing structures 98 bolted or otherwise fixedly secured to the frame element 24, lower journal or bearing structures 99 bolted or otherwise fixedly secured to the bottom wall 86 of the tray structure, and links or arms 100 secured to shafts or rods pivotally supported by the bearing structures 98 and 99 respectively associated therewith. There are four such supports for the tray structure 82 which, as viewed in FIG. 1, is swingingly supported by the links 100 for longitudinal displacements generally along the frame element 24.

Cyclic displacements in such longitudinal directions are enforced upon the tray structure 82 by a crank mechanism 101 that includes a rod 102 pivotally connected at one end (as shown at 103) to the end wall 89 of the tray structure 82. Adjacent its opposite end, the rod 102 is pivotally secured to the offset or throw (not shown) of a crankshaft 104 journaled for rotation in transversely spaced bearings 105 supported by the leg 19 of the frame structure 18. The crankshaft 104 is rotatably driven by a sprocket 106 constrained thereon which is engaged by an endless chain 107 entrained about a drive sprocket 108 constrained upon a shaft 109 so as to rotate therewith. The shaft 109 is journaled for rotation in spaced apart bearings (not shown) and is equipped with a large pulley wheel 110 driven by a belt 111 entrained about the output sheave 112 of an electric drive motor 113.

Evidently, whenever the motor 113 is energized, it continuously drives the pulley wheel 110 and shaft 109 secured thereto which in turn drives the sprocket 108, chain 107, sprocket 106 and crankshaft 104. As a consequence thereof, the rod 102 is cyclically reciprocated in longitudinal directions, whereupon the tray structure 82 is similarly vibrated or cyclically reciprocated longitudinally with the result that the nut kernels discharged thereinto through the mouth 81 of the scroll 80 are advanced along the perforate divider wall 91 or bottom wall 86, as the case may be, for discharge through the respective chutes 92 and 93.

As indicated hereinbefore, the apparatus includes a second kernel dicing or cutting station defined by the cutting mechanism 49, and it may be observed by comparing the two mechanisms 31 and 49 as they are viewed in FIGS. 1, 2, and 8 that such mechanisms are substantially identical except for very minor structural variations, the most important of which concerns the scroll of the mechanism 49 which does not have a depending wall structure forming the restricted mouth or opening at the lower end thereof which depending wall structure is not required because of the close proximity of such opening to the endless belt 94 of the conveyor mechanism 95. Since the two mechanisms 31 and 49 are the same in all significant respects, no further structural description of the mechanism 49 will be included; and in the drawing, the same numerals are used to identify the components of the mechanism 49 that respectively corresponds to the described components in the mechanism 31, except that the suffix "a" has been added for the purposes of differentiation.

The slitting or cutting mechanism 49 is driven in enforced synchronism with the mechanism 31 by the aforesaid drive chain 37 which, as is evident in both FIGS. 1 and 11, drivingly engages a sprocket 36a mounted on a shaft 33a with which the drum 32a of the mechanism 49 is provided. Thus, nut kernels which are not sufficiently small to pass through the perforate bottom wall 91 of the upper tray section 84 of the tray structure 82 are advanced along such perforate wall until they drop into the chute 92 and are carried thereby into the various pockets 83a of the mechanism 49 for further subdivision by the cooperative engagement of the knife structures 56a thereof with the cutting blades 51a. The nuts are discharged from the pockets 83a as they are rotated downwardly toward the opening 81a of the scroll 80a for deposition onto the conveyor mechanism 95.

The conveyor mechanism 95, as shown best in FIGS. 8 and 10, includes the aforementioned endless belt 94 which is entrained at opposite ends thereof about an idler drum 114 and about a driven drum 115 mounted upon the aforementioned shaft 39 so as to be driven thereby from the motor 46 via the gear reducer 43, chain 41 and sprocket 38, all as described hereinbefore. As the conveyor belt 94 is advanced from left to right along the upper path or reach thereof, nut kernels are deposited thereon through the chute 93 and through the opening 81a in the scroll 80a of the cutting mechanism 49; and the kernels after being advanced by the belt are discharged from the end thereof as it traverses the arcuate path defined by the drum 115 and drop into a longitudinally vibratory separator tray structure 116. As shown in FIGS. 9 and 10, a magnet device 117 comprised of a pair of longitudinally spaced permanent magnets 117a and 117b extends over the belt 94 adjacent the discharge end thereof and is sufficiently powerful to remove ferrous metal particles from the belt should any be deposited thereon which might occur, for example, should one of the knife structures 56 and 56a or one of the blade structures 51 and 51a break or become dislodged and find it way onto the belt. The magnet device 117 is pivotally movable between the lower operative and upper inoperative positions respectively shown by full and broken lines in FIG. 10 so as to enable the magnet to be cleared of any such metal particles that may be adhering thereto.

The separator tray structure 116 is generally similar in structure and is substantially identical in function to the transfer tray structure 82 heretofore described, and it is operative to classify or separate the subdivided nut kernels in accordance with the sizes thereof. In the particular apparatus being considered, the size classification involves dividing the kernels into three separate groups respectively identifiable with the containers or receptacles 118, 119 and 120 disposed beneath the tray structure 116 in longitudinally spaced juxtaposition, as shown in both FIGS. 1 and 10. The container 118 is adapted to receive nut kernels of the smallest size, the container 120 receives kernels of the largest size, and the container 119 receives kernels of an intermediate size. The classification and deposition of nut kernels into the containers 118, 119 and 120 is determined by the tray structure 116 and particularly by the bottom wall 121 thereof which, as shown best in FIG. 9, is perforate and is provided throughout with a plurality of apertures or openings 112 therethrough.

The openings 122 are arranged in two longitudinally oriented groupings generally corresponding in longitudinal extent to the lengths of the respectively associated containers 118 and 119 underlying such groups of openings. The openings in the two groups thereof differ in size, and by way of example, as a specific instance the openings 122 generally located above the container 118 may have a diameter of about one-fourth of an inch, and the openings 122 disposed above the container 119 may have a diameter of about three-eights of an inch. Thus, nut kernels of about one-fourth of an inch or less in size fall through the bottom wall 121 and into the container 118, any remaining nut kernels having a maximum dimension of three-eights of an inch or less fall through the bottom wall 121 and into the container 119, and the nut kernels that still remain upon the bottom wall 121 are finally discharged from the end thereof and into the container 120, as shown in FIG. 10.

The tray structure 116 is supported at spaced apart locations for longitudinally oriented vibratory movements, and such supports are shown best in FIG. 10 and are respectively designated with the numerals 123 and 124. The supports 123 and 124 are substantially identical, and each includes upper journal or bearing structures 125 bolted or otherwise fixedly secured to the frame element 22, lower journal or bearing structures 126 bolted or otherwise fixedly secured to the bottom wall 121 of the tray structure, and links or arms 127 secured to shafts or rods pivotally supported by the bearing structures 125 and 126 respectively associated therewith. These are four such supports for the tray structure 116 which, as viewed in FIG. 10 is swingingly supported by the links 127 for longitudinal displacements generally along the frame element 22.

The tray structure 116 is cyclically displaced in such longitudinal directions by a crank mechanism 128 which is substantially identical to the crank mechanism 101 heretofore described and is driven in enforced synchronism therewith by the motor 113 and shaft 109, as shown in FIG. 11. The crank mechanism 128 includes a shaft 129 pivotally secured to the tray 116, as shown at 130, and whenever the apparatus is in operation, the tray structure 116 is cyclically displaced or vibrated in longitudinal directions so as to advance nut kernels therealong for selective disposition into the receptacles 118, 119 and 120 as heretofore described.

Means are provided in the apparatus for removing any lightweight membranes associated with the nut kernels, especially the kernels of English walnuts. Such means includes suction apparatus somewhat in the form of a cyclone separator, as shown generally at 131 in FIG. 1, mounted upon a plurality of vertically extending legs or supports 132 that are welded or otherwise secured to the horizontal frame elements 133 of a platform structure having depending legs 134 fixedly secured to the horizontal frame components 22 of the frame structure 18. The apparatus 131 further includes a relatively large container 135 defining a collection chamber therewithin, and such chamber has a transversely elongated intake conduit 136 communicating therewith and extending over the tray structure 116, as shown most clearly in FIG. 9.

The container 135 is provided with an outlet conduit or flue 137 connected with a fan or blower (not shown) which is adapted to provide a reduced pressure at the inlet of the intake conduit 136 so that lightweight particles are sucked thereinto. Such particles are released from the airstream within the container 135 because of the change in velocity of the air discharging thereinto, all as is well known; and the container is somewhat cone-shaped at its lower end and is provided thereat with a manually movable door 138 through which the contents collected in the bottom portion of the container can be emptied into a receptacle 139. Evidently, the agitation of the nut kernels within the tray structure 116 resulting from the vibratory displacements thereof tends to free such membranes from the nut particles; and because of the lightweight character of the membranes, they are sucked into the conduit 136 along with the air drawn thereinto, and are released within the container 137 for discharge therefrom into the receptacle 139 whenever the door or closure member 138 is opened.

OPERATION

In operation of the nut kernel dicing machine the motors 46 and 113 are energized through suitable switch controls and circuitry (not shown) which may be completely conventional and are therefore well known. Energization of these motors causes the drums 32 and 32a of the slitting or cutting mechanisms 31 and 49 to rotate, and causes the tray structures 82 and 116 to cyclically reciprocate in longitudinal directions. Such control switches also energize the vibrator 27, whereupon the tray 26 connected therewith is agitated. Upon placing nut kernels within the hopper 15, the machine will function to subdivide such kernels into smaller units.

In this respect, nut kernels 29 dropped from the hopper 15 into the tray 26 are caused to move into and through the chute 30 and into the angularly spaced pockets 83 moved in succession into alignment with such chute so as to receive nut kernels therefrom. As the filled pockets are advanced in a clockwise direction (as viewed in FIG. 2) the nut kernels forwardly of any group of blades 51 are advanced therewith toward the knife structures 56 and are cut or slit by the coaction of the resiliently biased knives 57 and the cutting blades 51 because the knife structures are biased toward engagement with the outer surface of the cylindrical shell 54 of the drum and respectively pass through the slots or openings 52 defined between adjacent cutting blades 51. The kernels so subdivided by the mechanism 31 drop downwardly from the scroll 80 thereof and into the tray structure 82 which allows kernels of relatively small size to pass downwardly through the divider wall or screen 91 thereof and into the bottom tray section 85 while the larger nut kernels remain within the upper tray section 84.

The vibratory displacements imparted to the transfer tray structure 82 by the crank mechanism 101 (the longitudinal limits being shown by broken lines in FIG. 2) cause the nut kernels to advance along the tray structure to the ends of the sections 84 and 95 thereof for respective discharge therefrom into the chutes 92 and 93. The nut kernels passing through the chute 93 are deposited directly onto the endless belt 94 of the conveyor structure 95, while the nut kernels passing through the chute 92 are recieved within the pockets 83a of the cutting mechanism 49 as such pockets are advanced successively into alignment with the chute 92. Such nut kernels are further reduced in size by the coaction of the knife structures 56a and cutting blades 51a and the subdivided kernels are discharged from the scroll 80a onto the belt 94 for discharge therefrom into the tray structure 116.

The vibratory displacements of the separator tray structure 116 cause the nut kernels discharged thereinto to advance therealong; and in passing over the openings 122 in the bottom wall 121 of such tray structure, the nut kernels are segregated or classified in accordance with their size, the smallest kernels units dropping through the bottom wall into the container 118, the next larger kernel units falling through the layer openings in the bottom wall and into the container 119, and still larger kernels being discharged from the end of the tray structure into the container 120. Vibratory displacements are imparted to the tray structure 116 by the crank mechanism 128, and the extent of such vibratory displacements is shown by the broken lines in FIG. 10.

Any magnetic particles being advanced along the endless belt 94 of the conveyor mechanism 95 are removed therefrom by one or the other of the two magnets provided by the magnet device 117, and any foreign objects so collected on the under surface of such magnets can be removed therefrom by lifting the frame support for such magnets upwardly to expose the undersurfaces thereof. Any lightweight particles, and particularly the thin lightweight membranes commonly found in association with nut kernels, are removed by the vacuum suction mechanism 131 which provides an intake conduit 136 that extends over the tray structure 116 and provides a reduced or subatmospheric pressure at its inlet sufficient to cause such lightweight particles to be drawn thereinto for collection within the container 135. Evidently, any very small particles of the nut kernel are drawn into the conduit 136, but as stated hereinbefore the amount of such fine particles is minimized in the apparatus because no abrading or cracking actions are relied on the subdivide the nut kernels, and the nut kernel debris which would result from such actions is not present.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

We claim:

1. In a machine for subdividing nut kernels and the like by dicing the same into smaller units, a cutting mechanism operative to subdivide nut kernels advanced thereto into smaller units, infeed means for delivering nut kernels to said cutting mechanism, classification means for segregating kernels following subdivision thereof to separate the subdivided kernels in accordance with their sizes, said classification means including a vibratory separator tray structure having an elongated generally horizontal perforate wall provided with a plurality of groups of openings adapted to pass nut kernels therethrough and each group of which has openings that are greater in size from those of the preceeding group so as to classify such kernels in accordance with the sizes thereof, said groups of openings being longitudinally oriented with respect to each other and the nut kernels respectively discharged therethrough being collected to define such size classifications thereof, and magnet structure extending across the path of movement of subdivided kernels to remove any magnetic metal particles therefrom.

2. The machine according to claim 1 and further including conveyor means having a nonmagnetic carrier for receiving subdivided kernels thereon and for delivering the same to said classification means said magnet structure being oriented in overlying juxtaposition with said conveyor means in close proximity with said carrier so as to remove any such metal particles transported thereby.

3. In a machine for subdividing nut kernels and the like by dicing the same into smaller units, a cutting mechanism operative to subdivide nut kernels advanced thereto into smaller units, infeed means for delivering nut kernels to said cutting mechanism, classification means for segregating kernels following subdivision thereof to separate the subdivided kernels in accordance with their sizes, said classification means including a vibratory separator tray structure having an elongated generally horizontal perforate wall provided with a plurality of groups of openings adapted to pass nut kernels therethrough and each group of which has openings that are greater in size from those of the preceeding group so as to classify such kernels in accordance with the sizes thereof, said groups of openings being longitudinally oriented with respect to each other and the nut kernels respectively discharged therethrough being collected to define such size classifications thereof, and air separation means for removing lightweight membranes and the like from subdivided kernels and including a wide suction inlet extending substantially entirely across said perforate wall intermediate the ends thereof in relatively close proximity therewith.

4. The machine according to claim 3 and further including magnet structure extending across the path of movement of subdivided kernels to remove any magnetic metal particles therefrom.

5. The machine according to claim 4 and further including conveyor means having a nonmagnetic carrier for receiving subdivided kernels thereon and for delivering the same to said classification means, said magnet structure being oriented in overlying juxtaposition with said conveyor means in close proximity with said carrier so as to remove any such metal particles transported thereby.

6. The machine according to claim 5 in which said cutting mechanism includes first and second cutting stations each having a cutting mechanism thereat, said infeed means being operative to deliver nut kernels to the first station and said conveyor means being positioned to receive subdivided nut kernels from the second station, and transfer mechanism for receiving kernels at said first station and for advancing the same to said second station.

7. The machine of claim 6 in which said transfer mechanism includes a vibratory transfer tray structure also having a perforate wall adapted to pass therethrough nut kernels not exceeding a predetermined size and to advance kernels in excess of such size along said perforate wall thereof, said transfer mechanism being adapted to receive kernels from said first cutting mechanism and to advance kernels in excess of such predetermined size to said second cutting mechanism for further subdivision thereby, the kernels passed through the perforate wall of said transfer tray structure being received on the carrier of the aforesaid conveyor means and advanced thereby so as to bypass said second cutting mechanism and be delivered directly to said classification means.